(12) United States Patent
Hammond et al.

(10) Patent No.: US 11,890,626 B2
(45) Date of Patent: Feb. 6, 2024

(54) PRESSURIZED AIR POWERED LIQUID SPRAYER

(71) Applicants: Colleen Hammond, Irvine, CA (US); Robert Hammond, Irvine, CA (US)

(72) Inventors: Colleen Hammond, Irvine, CA (US); Robert Hammond, Irvine, CA (US)

(*) Notice: Subject to any disclaimer, the term of this patent is extended or adjusted under 35 U.S.C. 154(b) by 1 day.

(21) Appl. No.: 17/817,893

(22) Filed: Aug. 5, 2022

(65) Prior Publication Data

US 2023/0053287 A1 Feb. 16, 2023

Related U.S. Application Data

(60) Provisional application No. 63/231,633, filed on Aug. 10, 2021.

(51) Int. Cl.
| | |
|---|---|
| B05B 11/06 | (2006.01) |
| B05B 7/24 | (2006.01) |
| B05B 12/00 | (2018.01) |

(52) U.S. Cl.
CPC ............ *B05B 11/061* (2013.01); *B05B 7/241* (2013.01); *B05B 7/2418* (2013.01); *B05B 12/002* (2013.01)

(58) Field of Classification Search
CPC ......... B63B 32/60; B63B 32/40; B63B 32/51; B63B 32/50; B05B 7/241; B05B 7/2418; B05B 12/002; B05B 11/061; B67D 1/04

USPC ................................... 222/399, 394
See application file for complete search history.

(56) References Cited

U.S. PATENT DOCUMENTS

| | | | | |
|---|---|---|---|---|
| 5,772,075 A | * | 6/1998 | Ash, Jr. ................... | B67D 1/04 222/399 |
| 6,257,944 B1 | * | 7/2001 | Herrod .................... | F41B 9/004 441/130 |
| 7,264,522 B2 | * | 9/2007 | Lee ....................... | F41B 9/0037 441/65 |

\* cited by examiner

*Primary Examiner* — Vishal Pancholi
*Assistant Examiner* — Robert K Nichols, II
(74) *Attorney, Agent, or Firm* — Kevin Schraven; Heber Martin Carbajal; Hankin Patent Law, APC

(57) ABSTRACT

A liquid sprayer powered by an inflatable standup paddle board (iSUP), comprising: a container; a sprayer hose; and an air hose. The container is configured to hold a liquid, the sprayer hose comprises a spray nozzle and is configured to pass the liquid from the container through the spray nozzle. The air hose may be configured to connect to the container and to an iSUP. The air hose may comprise a flow regulator and one-way check valve. The flow regulator is configured to start, stop, increase, and decrease a flow of air from the iSUP into the container. The one-way check valve substantially prevents the liquid from entering the iSUP. The container may accept the flow of air from the iSUP when connected to the iSUP, such that the container is pressurized. When the container is pressurized, the spray nozzle passes the liquid out of the liquid sprayer.

20 Claims, 13 Drawing Sheets

US 11,890,626 B2

PRESSURIZED AIR POWERED LIQUID SPRAYER

CROSS-REFERENCE TO RELATED APPLICATIONS

This application claims the benefit of U.S. Provisional Patent Application No. 63/231,633 filed Aug. 10, 2021, by inventors Colleen Hammond and Robert Hammond, the contents of which are expressly incorporated herein by this reference, and to which priority is claimed.

FIELD OF THE DISCLOSURE

The present disclosure relates generally to devices, methods, and systems for using a pressurized air source to power a liquid sprayer. More specifically, the present disclosure relates to a device that allows pressurized air from an inflatable stand-up paddle board to power a liquid sprayer or portable shower.

BACKGROUND

Recreational standup paddleboarding has been enjoyed by water sports enthusiasts since as early as the 1900s. The design of the boards has changed drastically overtime. Early renditions were comprised of natural materials such as various woods and tar. Modern iterations are comprised of a myriad of materials including Styrofoam, resins, plastics, rubbers, and various other synthetic material. People have used the boards for surfing, touring, fishing, and even yoga. Being much larger than a conventional surfboard, standup paddle boards have been difficult to transport to and from various bodies of water. With an average size of ten (10) feet in length and approximately 32 inches in width, transporting the boards required complex tie down systems and vehicles equipped with special transportation equipment. One development that aimed to address the difficulty of transportation was the inflatable stand-up paddle board (iSUP).

iSUPs provide all the capabilities of the traditional paddleboard but allow the user to break down the size of the board to a more manageable and transportable size. However, after being exposed to various elements such as sand, water, salt, dirt, or other undesirable organic debris, there is a need to wash the board down prior to stowage. Users have had to find either a source of pressurized water or use another method of cleaning that is not as effective, such as using rags, which can merely spread any unwanted debris. Even if one had a few gallons of water, it is inconvenient and time consuming to have to stop, pour, and possibly cleanse any dirty areas with a rag. Lastly, if a user desired to use a portable pressurized source, he or she would have to find a source to pressurize the water and then have to transport the pressurizing agent along with the board, water, and the pressurized vessel. Or the vessel has to be cumbrously pressurized using a hand or foot pump which takes additional time and results in low operating pressure.

Thus, what is needed is a device and a method to clean an iSUP conveniently and thoroughly prior to disassembly and stowage. Preferably the device would be capable of offering the effectiveness of pressurized water without having to carry additional equipment, sources of pressurized air, or having to manually pressurize the cleaning system using a hand or foot pump.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

One embodiment may be a liquid sprayer powered by a pressurized air source which may comprise a container, a spray hose, a spray nozzle, and an iSUP connector. Wherein the container has an inlet for allowing pressurized air to enter the container and an outlet for allowing a liquid to exit the container. A liquid sprayer powered by a pressurized air source wherein the container may comprise one or more caps. A liquid sprayer powered by a pressurized air source wherein the container may comprise a handle. A liquid sprayer powered by a pressurized air source wherein the inlet may be housed in an inlet cap. A liquid sprayer powered by a pressurized air source wherein the outlet may be housed in an outlet cap. A liquid sprayer powered by a pressurized air source wherein the outlet and the inlet share one combination cap, wherein the combination cap may have a connection for the spray hose and a connection for the iSUP hose. A liquid sprayer powered by a pressurized air source wherein the sprayer hose may be connected to the outlet and the spray nozzle may be connected to the spray hose, wherein the sprayer hose preferably extends to approximately the bottom of the container, wherein the iSUP hose may be connected to the inlet of the container, and wherein the iSUP hose may be connected to an iSUP by the iSUP connector. A liquid sprayer powered by a pressurized air source where in the iSUP hose may contain a flow regulator, check-valve, and one or more disconnect valves.

Another embodiment may include a liquid sprayer powered by a pressurized air source in which the iSUP comprises a disconnect adaptor which connects to an inlet hose on the container.

One embodiment may be a liquid sprayer powered by an inflatable standup paddle board (iSUP), comprising: a container; a sprayer hose; and an air hose; wherein the container is configured to hold a liquid; wherein the sprayer hose comprises a spray nozzle and is configured to pass the liquid from the container through the spray nozzle; wherein the air hose is configured to connect to the container and to an iSUP; wherein the air hose comprises a flow regulator and one-way check valve; wherein the flow regulator is configured to start, stop, increase, and decrease a flow of air from the iSUP into the container; wherein the one-way check valve is configured to substantially prevent the liquid from entering the iSUP; wherein the container is configured to accept the flow of air from the iSUP when connected to the iSUP, such that the container is pressurized; and wherein when the container is pressurized, the spray nozzle passes the liquid out of the liquid sprayer. Preferably, the sprayer hose may extend substantially to a bottom of the container. The container may comprise one or more inlet/outlets. In some embodiments there may be two inlet/outlets comprising a sprayer outlet and an air inlet; wherein the air inlet is configured to connect to the air hose; and the sprayer outlet is configured to connect to the sprayer hose. In another embodiment, the container comprises one inlet/outlet and is a combination sprayer outlet and an air inlet; wherein the inlet/outlet is configured to connect to both the air hose and the sprayer hose. The flow regulator may be a ball-valve or a clamping flow regulator.

In another embodiment, a liquid sprayer powered by an inflatable standup paddle board (iSUP), comprising: a container; a sprayer hose; an air hose; and an iSUP connector; wherein the container is configured to hold a liquid; wherein the sprayer hose comprises a spray nozzle and is configured to pass the liquid from the container through the spray nozzle; wherein the iSUP connector comprises an iSUP adaptor and a one-way check valve; wherein the iSUP connector is configured to start, stop, increase, and decrease a flow of air from an iSUP to the air hose and the container; wherein the air hose is configured to connect to the iSUP connector; wherein the flow regulator is configured to start, stop, increase, and decrease a flow of air from the iSUP into the container; wherein the one-way check valve is configured to substantially prevent the liquid from entering the iSUP; wherein the iSUP adaptor is configured to connect to the iSUP; wherein the container is configured to accept the flow of air from the iSUP when connected to the iSUP, such that the container is pressurized; and wherein when the container is pressurized, the spray nozzle passes the liquid out of the liquid sprayer. The sprayer hose may extend substantially to a bottom of the container. The container may comprise one or more inlet/outlets. If there are two inlet/outlets, they may comprise a sprayer outlet and an air inlet; wherein the air inlet is configured to connect to the air hose; and wherein the sprayer outlet is configured to connect to the sprayer hose. If container comprises one inlet/outlet, the inlet/outlet may be a combination sprayer outlet and an air inlet; and wherein the inlet/outlet may be configured to connect to both the air hose and the sprayer hose. The iSUP connector may comprise a first threaded portion and a second threaded portion that when twisted together may start and increase the flow of air, and when twisted apart may stop and decrease the flow of air. Preferably, the first threaded portion and the second threaded portion are configured to not be entirely disengageable. The flow regulator may be a ball-valve, a clamping flow regulator, or any other type of flow regulator that allows the user to control the flow of air manually or automatically from the iSUP.

Another embodiment may be a connector that connects a liquid sprayer to a pressurized air source for powering the liquid sprayer, comprising: an air hose; a one-way check valve; a flow regulator; a container connector; and an air source connector; wherein the air source connector is configured to connect to a pressurized air source and accept a flow of air from the pressurized air source when connected; wherein the air source connector is configured to connect to the air hose; wherein the air hose is configured to be connected to the liquid container connector; wherein the one-way check valve is configured to substantially prevent a liquid from the container from entering the pressurized air source; and wherein the flow regulator is configured to start, stop, increase, and decrease the flow of air from the pressurized air source into the container. The container connector may be selected from the group of connectors comprising: a threaded connector and a quick-release connector. The pressurized air source may be an inflatable standup paddle board (iSUP) and the air source connector may be configured to engage with the iSUP. The air source connector may comprise the one-way check valve and the flow regulator.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
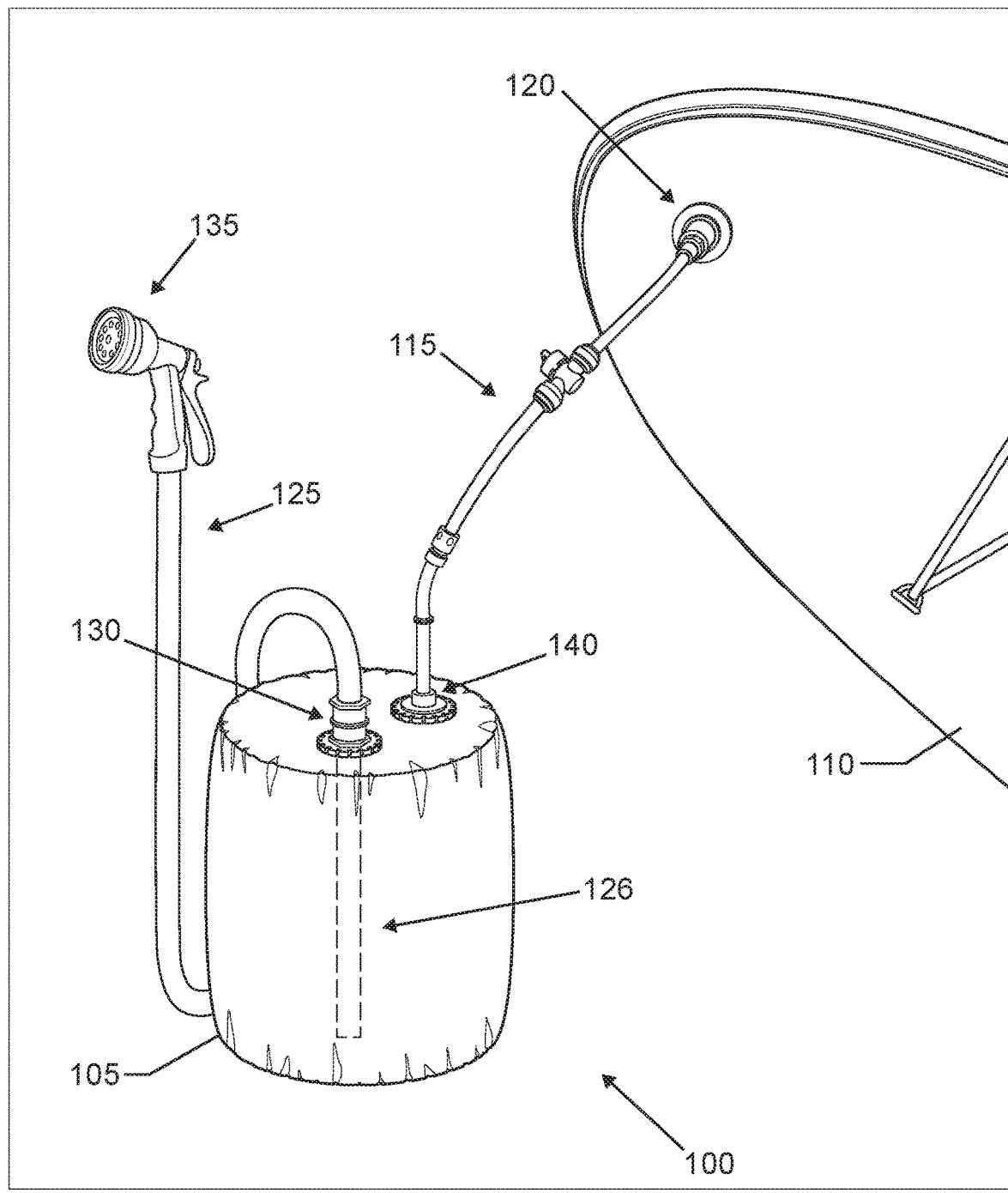
FIG. 1 is an illustration of one embodiment of a liquid sprayer powered by a pressurized air source.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-40% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

One embodiment may be a pressurized liquid air sprayer, configured to where the pressurized sprayer may receive air from an inflatable stand up paddle board (iSUP) through a deflation valve, which may typically be a twist lock type valve, such as a Halkey-Roberts® valve based on industry standards for iSUPs. Air may travel through an iSUP line into a container by means of an cap with an air inlet, which may preferably pressurize the container. Water within the container may then exit the container through an outlet and travel through a spray hose to a spray nozzle, which may preferably be used to wash or rinse the iSUP. Other embodiments may include a travel size version in which the container may be one gallon in capacity or smaller. Various embodiments may include different length iSUP hoses or variations in connections along the iSUP hose.

For purposes of this disclosure, the term "inflatable standup paddle board", "iSUP", and "pressurized air source", refers to any inflatable paddle board, standup paddle board, inflatable kayak, inflatable boat, inflatable dock, inflatable chair, and any other inflatable device manufactured with drop-stitch technology requiring inflation.

Additionally, in some embodiments, the pressurized air source or iSUP may refer to portable and inflatable "power cells" (devices made for the express purpose of providing pressurized air) made from drop-stitch technology of various sizes that are pre-inflated with air, typically in the range of 5-30 PSI capacities.

FIG. 1 is an illustration of one embodiment of a liquid sprayer powered by a pressurized air source. FIG. 1 is an illustration of one embodiment of a liquid sprayer 100 powered by a pressurized air source. The sprayer 100 may comprise a container 105, a hose 115, inlet 140, outlet 130, sprayer hose 125, 126, and spray nozzle 135. As shown, the container 105 may be connected to an inflatable standup paddle board (iSUP) 110, which is the preferable pressurized air source for the sprayer 100, by the iSUP hose 115. Preferably the iSUP hose 115 may be a fluid (liquid and air) tight hose or tube, sometimes referred to herein as an air hose or as a hose. The hose 115 may be connected to the iSUP 110 by a connector 120, which may be a Halkey-Roberts® valve, or another type of twist lock connector, a threaded connector, a quick connect device, or the like. The iSUP hose 115 may preferably connect to the container 105 through inlet 140. Sprayer hose 125, which may be a liquid tube or hose, may connect to the container 105 through an outlet 130. The distal end of sprayer hose 125 may connect to a spray nozzle 135, allowing the operator to controllably wash the iSUP 110. Other embodiments of the spray nozzle 135 may include mist type nozzles or rinse type nozzles. FIG. 1 also shows that the sprayer hose 125 may have a proximal length 126 and end that extends substantially to the bottom of the container 105. In this manner, substantially all of the water loaded into container may be pushed by the incoming air from the iSUP 110 out through spray nozzle 135. Once all of the water in the container 105 is depleted, the container 105 may be refilled if necessary.

Typically, the air pressure within the iSUP 110 may be approximately 15 psi, so all parts of the sprayer 100 may preferably be rated to handle well over 15 psi.

Although the outlet 130 and inlet 140 are shown substantially on a top of said container 105, they may be on the sides or bottom without deviating from the scope of the present disclosure. If the outlet is on the bottom or base of a side of the container, then the interior part of the spray hose may not be needed.

Figure 2:
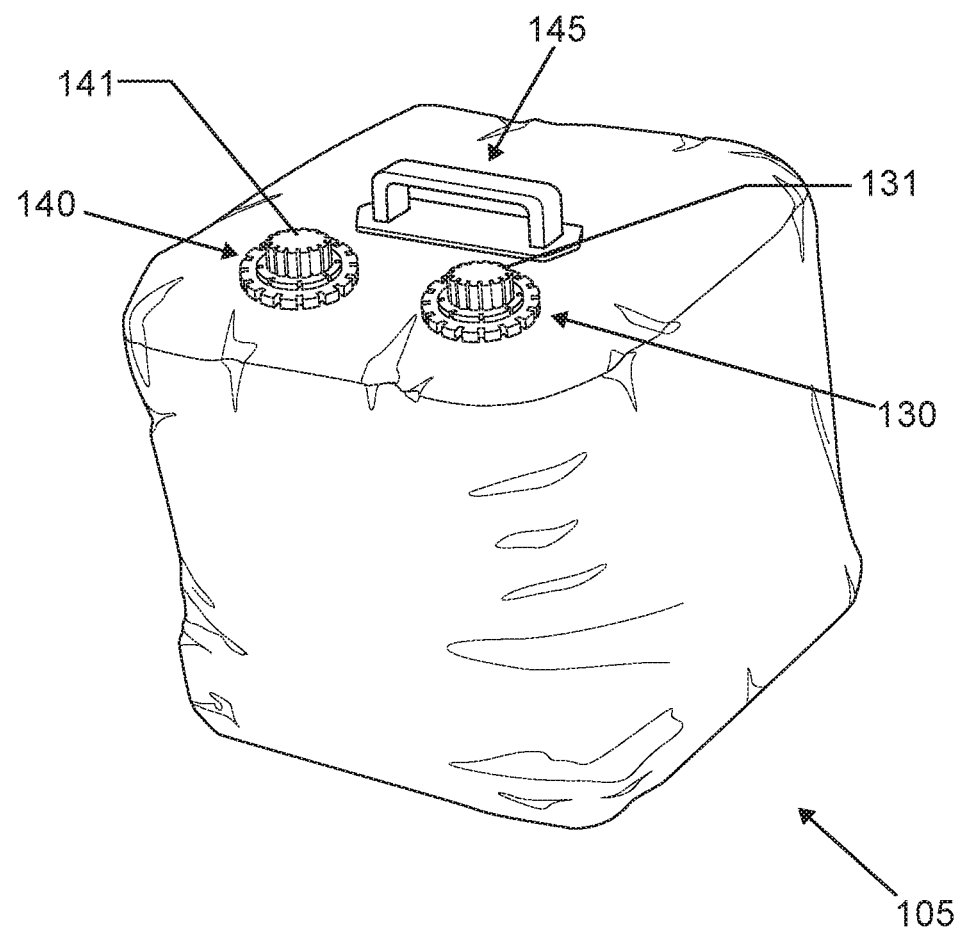
FIG. 2 is an illustration of one embodiment of a liquid container with two inlets/outlets and caps.

FIG. 2 is an illustration of one embodiment of a liquid container with two inlets/outlets and caps. FIG. 2 is an illustration of the container 105. The container 105 may preferably be made of a malleable (non-rigid) material so that it can be folded or collapsed after use. The material may be rated for approximately 20-25 psi of pressure and may be constructed from light weight plastics. Typically, the psi of the iSUP 110 drops about 2 psi in order to clear 5 gallons of water from the container 105, which may preferably be a 5-gallon container. Because the SUP typically starts at 15 psi, the container can be refilled with water several times before the SUP pressure no longer provides sufficient pressure for washing/spraying. The container 105 may preferably take 2-4 minutes to completely discharge its 5-gallon contents. In another embodiment, a travel version of the container may be available where the total volume of the container may be approximately 1 gallon. The container 105 may preferably comprise inlet 140, inlet cap 141, an outlet 130, and outlet cap 131. When the caps 141 and 131 are removed, the iSUP hose 115 and the sprayer hose 125, respectively, may be attached to the inlet 140 and outlet 130. A handle 145 may be attached to, or be part of, the container 105 for ease of transport. The sprayer hose 125 will preferably extend to the bottom of the container 105 as shown in FIG. 1, such that the pressurized air above the water will force the water into the sprayer hose 125 and out through the spray nozzle 135.

Figure 3:
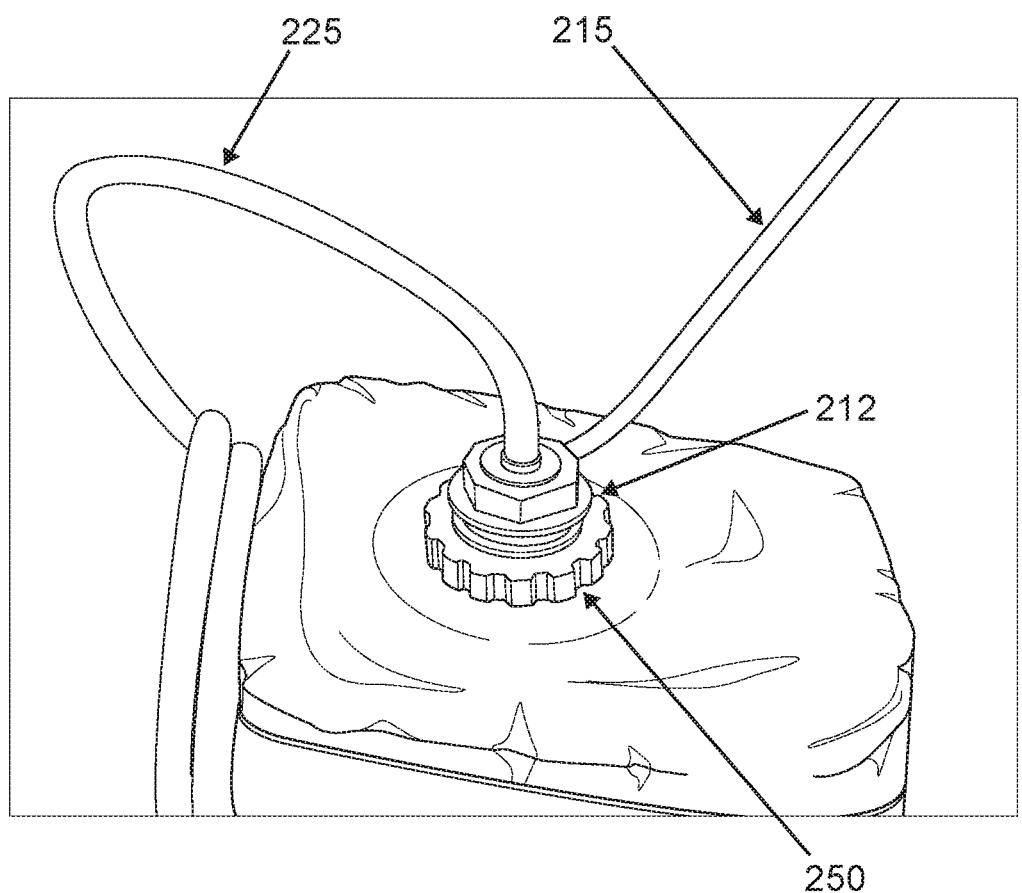
FIG. 3 is an illustration of one embodiment of a container with one embodiment of a cap with one inlet/outlet.

FIG. 3 is an illustration of another embodiment of a container with one embodiment of a single inlet/outlet. FIG. 3 shows one embodiment of a combination inlet/outlet 250 that engages with fitting 212, which may be connected to both the iSUP hose 215 and spray hose 225. Although the drawings show either one or two outlets/inlets, it should be understood that there may be more than two without deviating from the scope of the present disclosure.

Figure 4:
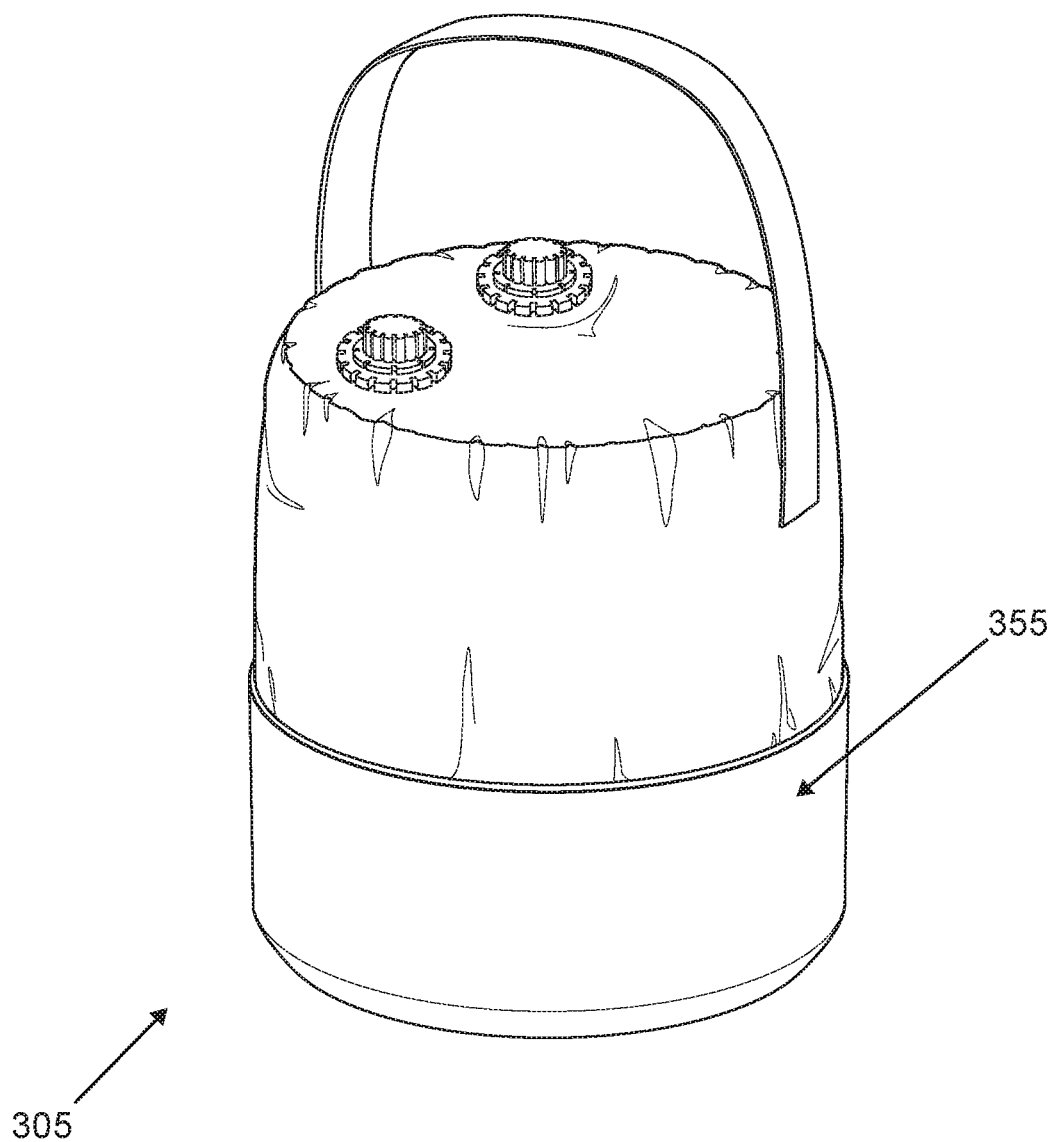
FIG. 4 is an illustration of one embodiment of a container with a rigid base.

FIG. 4 is an illustration of one embodiment of a container with a rigid base. FIG. 4 shows one embodiment of a container 305 with substantially rigid base 355. The rigid base 355 may consist of any rigid (non-malleable) material such that the container 305 will stand on its own as the water within is depleted through the sprayer. The non-rigid portion of the container 305 may be configured to fold into the rigid base 355 when the container 305 is empty. The rigid portion may comprise a hard rubber or similar type of material such that it may be partially collapsible for storage.

Figure 5:
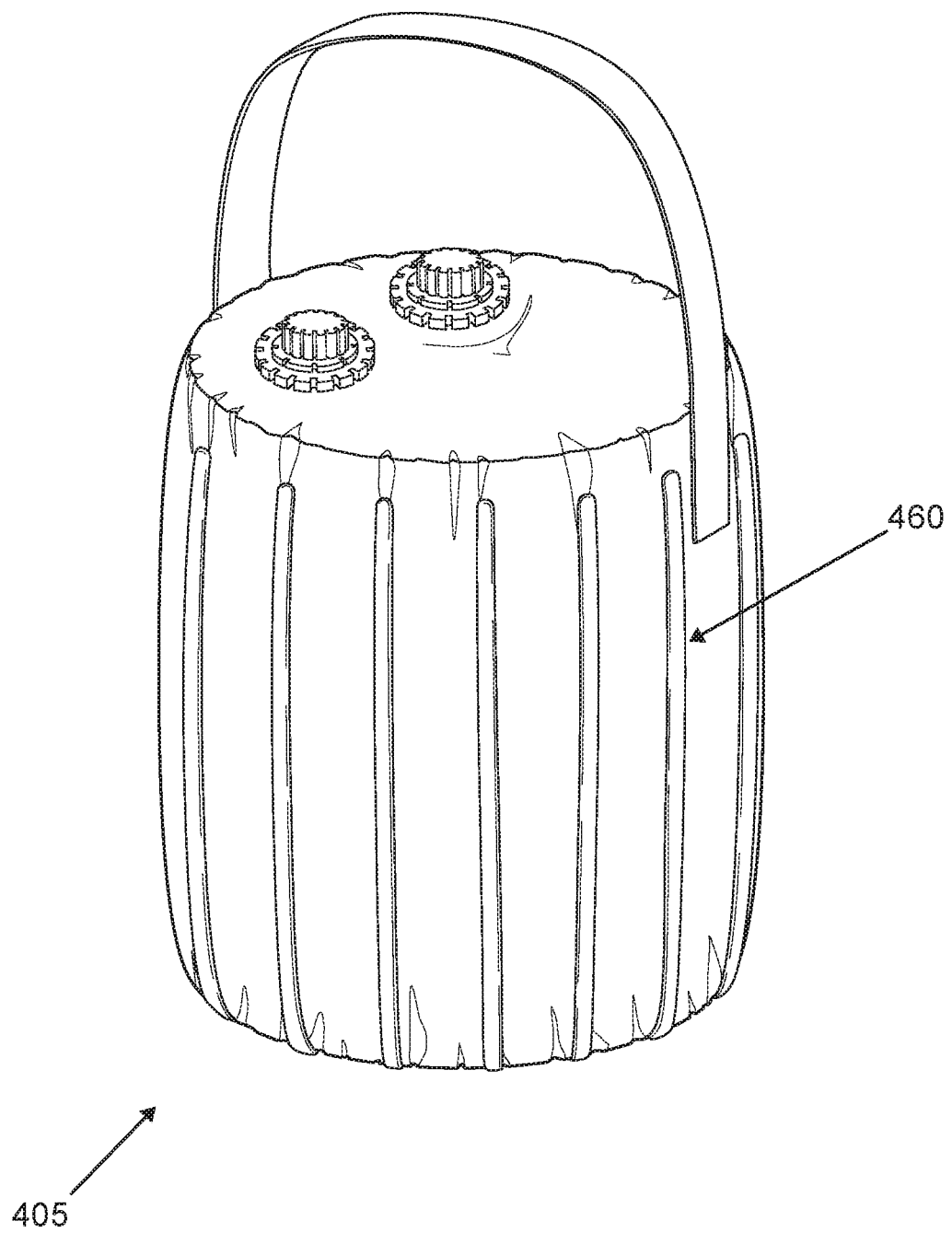
FIG. 5 is an illustration of one embodiment of a container with reinforced sides and bottom.

FIG. 5 is an illustration of another embodiment of a container with reinforced sides and bottom. FIG. 5 is one embodiment of a container 405 with vertical ribs 460 on the sides of the container 405 to support the container 405 so that it will stand on its own when filled, but can be rolled up when empty. The vertical ribs 460 may be comprised of rigid plastic strips attached to the inside or the outside of the container 405, or they may be sewn into the preferably malleable material of the container 405.

Figure 6:
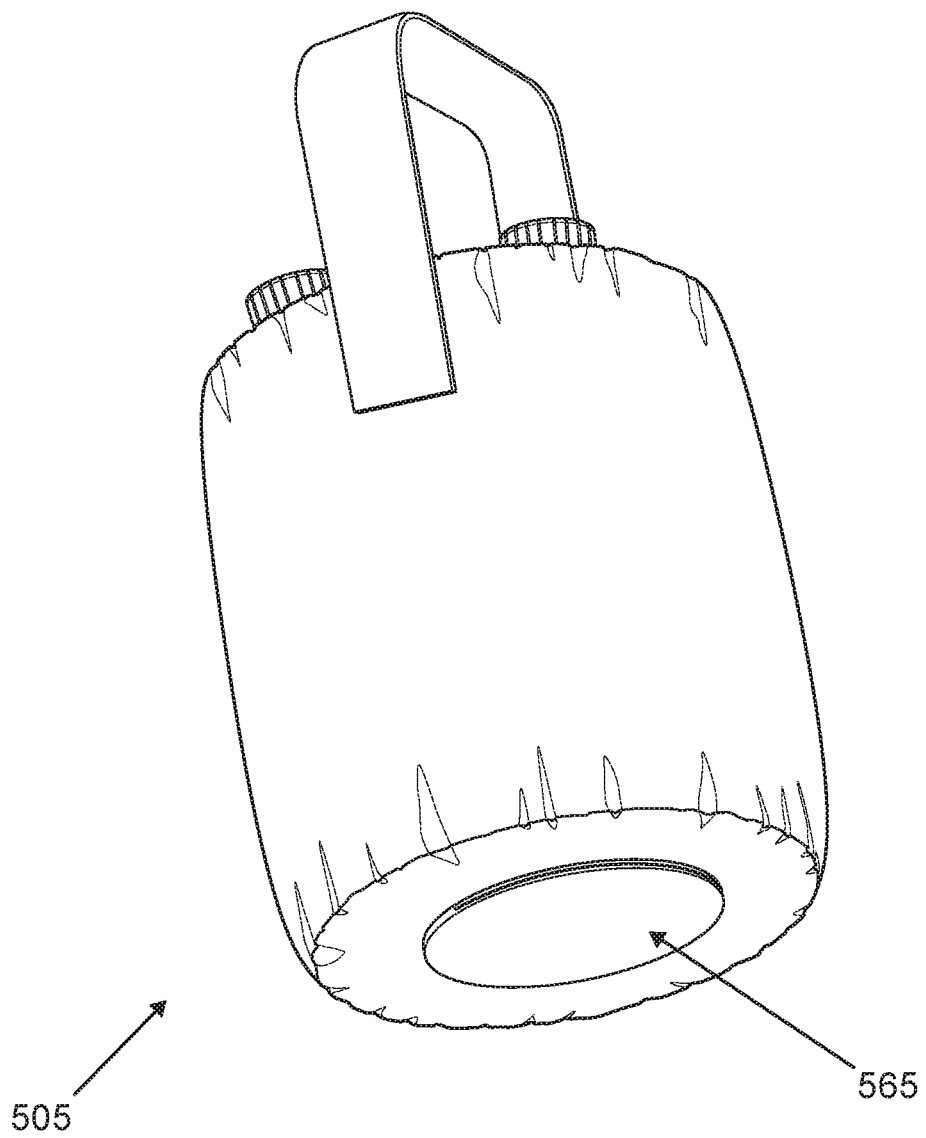
FIG. 6 is an illustration of one embodiment of a container with a weighted bottom.

FIG. 6 is an illustration of another embodiment of a container with a weighted bottom. FIG. 6 is one embodiment of a container 505 with a pouch 565 (or pocket) attached to or located at the bottom of the container 505. The pouch 565 may preferably contain any material that will keep the container 505 substantially upright during the filling and use of the container 505, such as sand, a metal plate, water, or any other material that would stabilize container 505 during filling and use.

Figure 7:
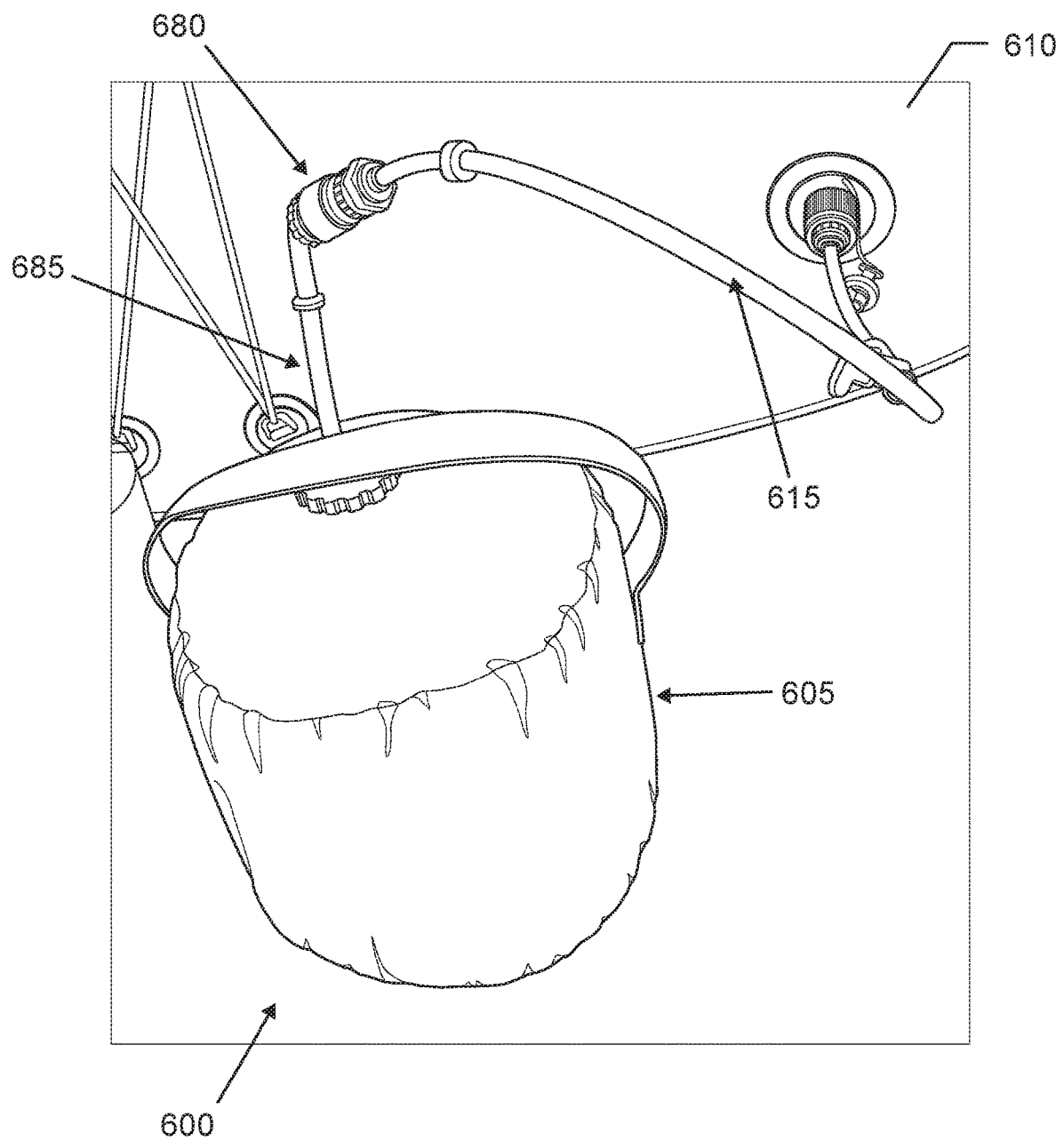
FIG. 7 is an illustration of an iSUP line connected to the container and to an iSUP.

FIG. 7 is an illustration of an iSUP line connected to the container and to an iSUP. FIG. 7 shows one embodiment of a liquid sprayer 600 powered by a pressurized air source 610 where the iSUP hose 615 is connected to the container 605. In this embodiment, a quick release connector and valve 680 may be included which separates the iSUP hose 615 from the inlet 685 of container 605. In this manner, the container 605 can be easily and quickly connected to the iSUP hose 615.

The quick release connector and valve 680 may be substituted for a threaded adaptor/valve or a push-and-twist type of disconnect valve. The quick release connector and valve 080 may allow the container 605 to maintain pressure if the iSUP hose 615 is disconnected from the pressurized air source 610.

Figure 8:
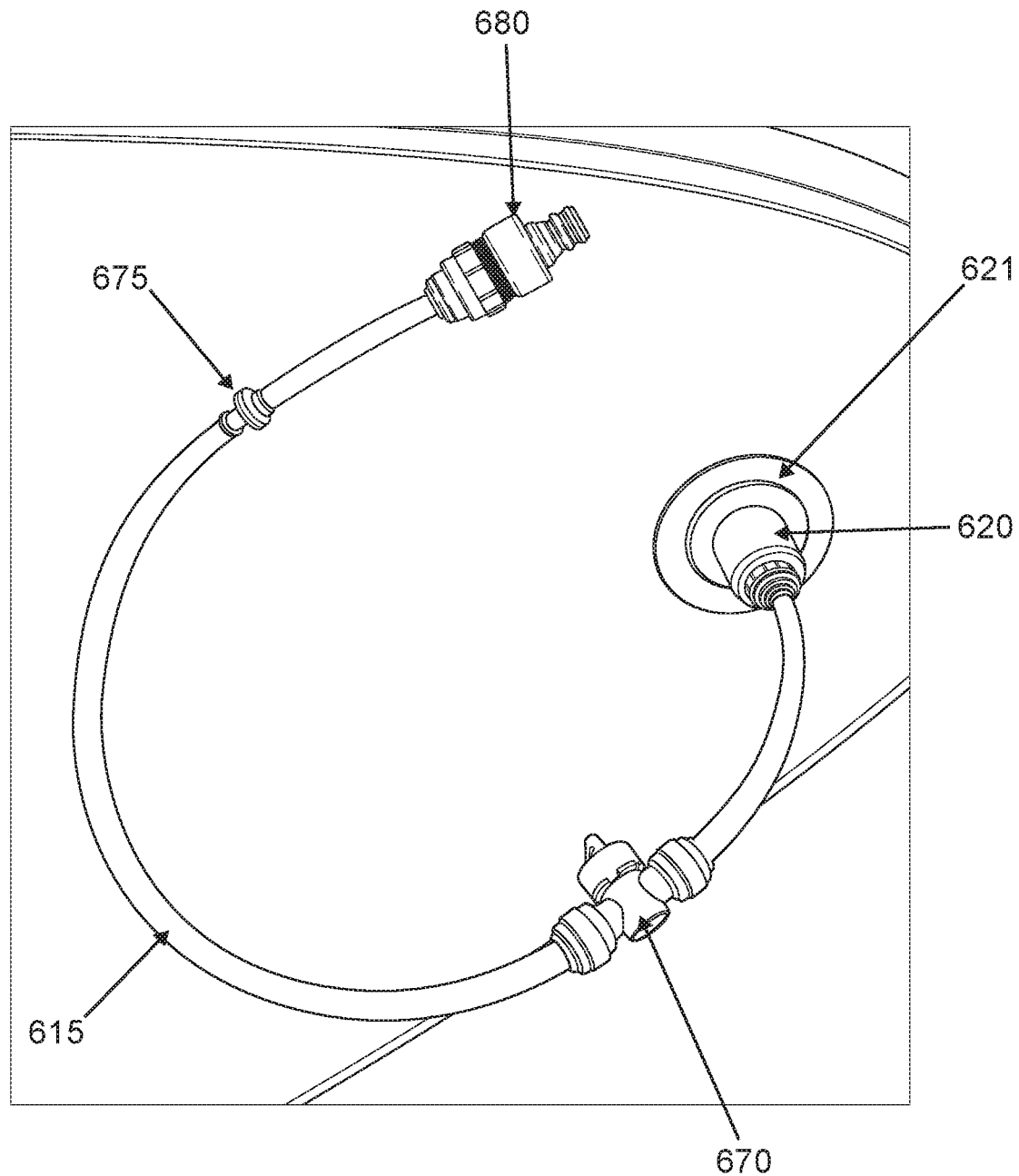
FIG. 8 is an illustration of an iSUP line connected to an iSUP.

FIG. 8 is an illustration of an iSUP line connected to an iSUP. FIG. 8 shows that the iSUP hose 615 may comprise an iSUP connector 620, flow regulator 670, one-way check valve 675 and one end (in this case, the male end) of a quick release connector and valve 680. Alternatively, the iSUP hose 615 may have a hose clamp flow regulator 770 (shown in FIG. 9). The flow regulator 670 may be entirely open, entirely closed, and all steps in between. In some embodiments, the flow regulator 670 may be a ball-valve flow regulator. This allows the use of the flow regulator 670 to reduce the flow of air out of the pressurized air source 610 or shut it off completely. The one-way check valve 675 ensures that any fluid, water or air, does not go back into the pressurized air source 610. The iSUP connector 620 may be a Halkey-Roberts® twist lock type valve but may be a different type of connector such that pressurized air from the pressurized air source 610 is only transferred to the container 605 when the iSUP hose 615 is connected to the pressurized air source 610. Most iSUPs have a standard air inlet/outlet 621 that prevents air from escaping the iSUP unless a male adapter is fit into the inlet/outlet 621. The iSUP connector 620 is preferably configured to matingly engage with the pressurized air source 610 inlet/outlet 621.

Figure 9:
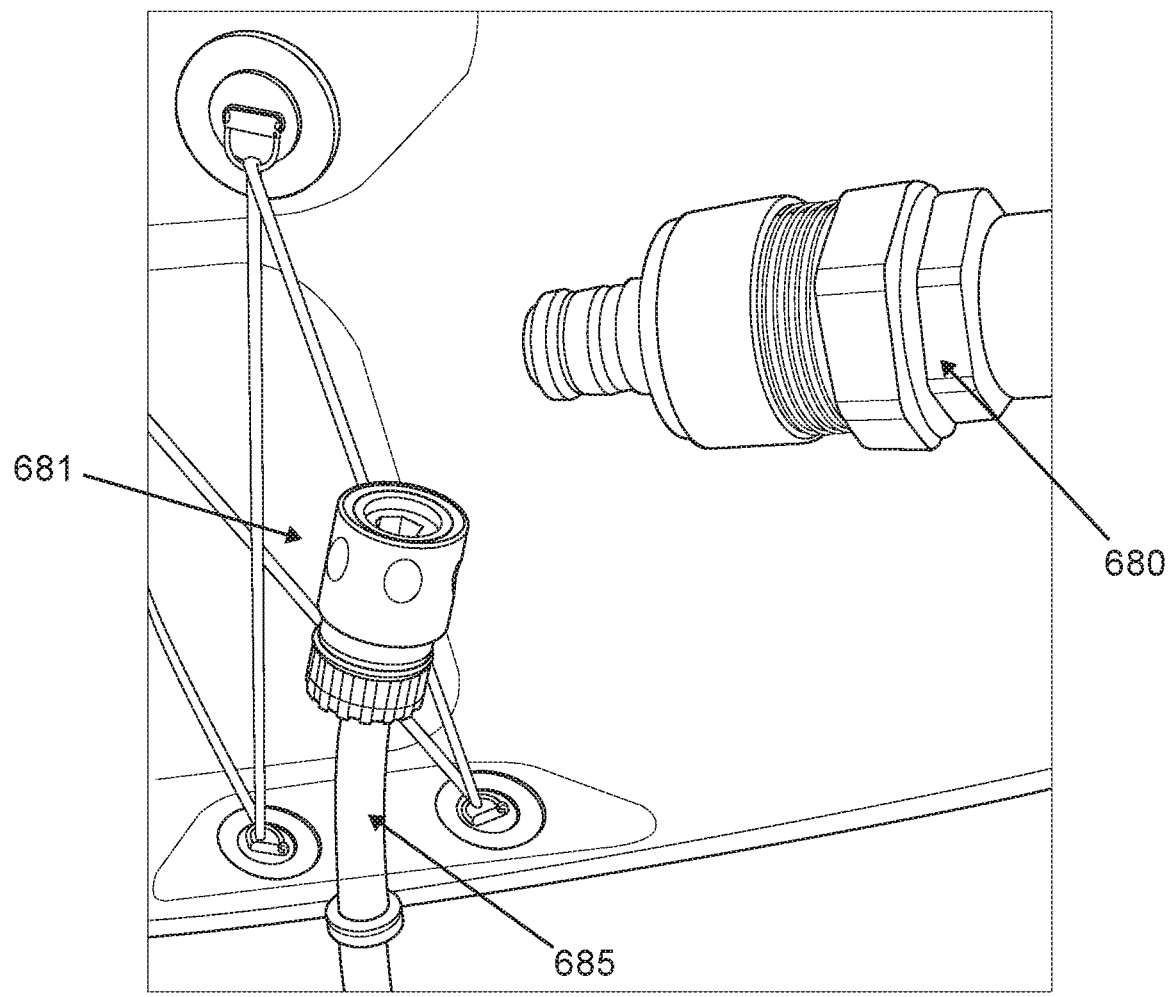
FIG. 9 is an illustration of one embodiment of a quick release connector.

FIG. 9 is an illustration of one embodiment of a quick release connector. As shown in FIG. 9, the quick release connector and valve may have a male portion 680 and a female portion 681. When disconnected, the male and female portions 680, 681 act as valves that are closed. When connected, the male and female portions 680, 681 act as valves that are open and allow air to flow freely. To connect and disconnect, the collar of the female portion 681 is pulled downward and the male portion 680 is inserted or removed, and then the collar springs back into place to lock the male portion 680 in place (if connecting). Other connection adaptors/valves may be used, such as twist lock or threaded adaptors.

Figure 10:
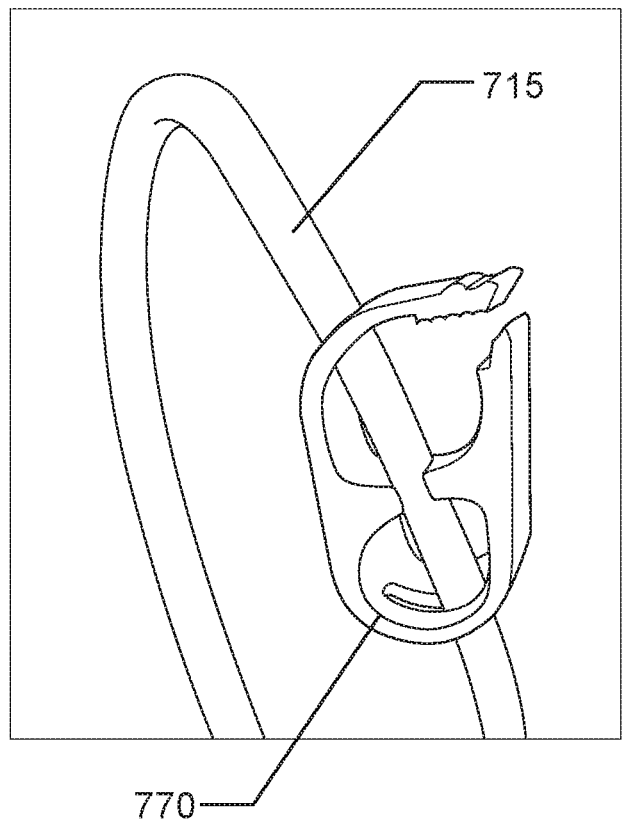
FIG. 10 is an illustration of one embodiment of a clamp-style flow regulator.

FIG. 10 is an illustration of one embodiment of a clamp-style flow regulator. As shown, the hose clamp flow regulator 770 may preferably made from plastic or metal such that sufficient tension exists to fully and/or partially impede flow of air through the iSUP line 715 by pinching. This type of flow regulator is also referred to a hose pincher. There are numerous styles of hose pinchers, many of which are adjustable.

Figure 11:
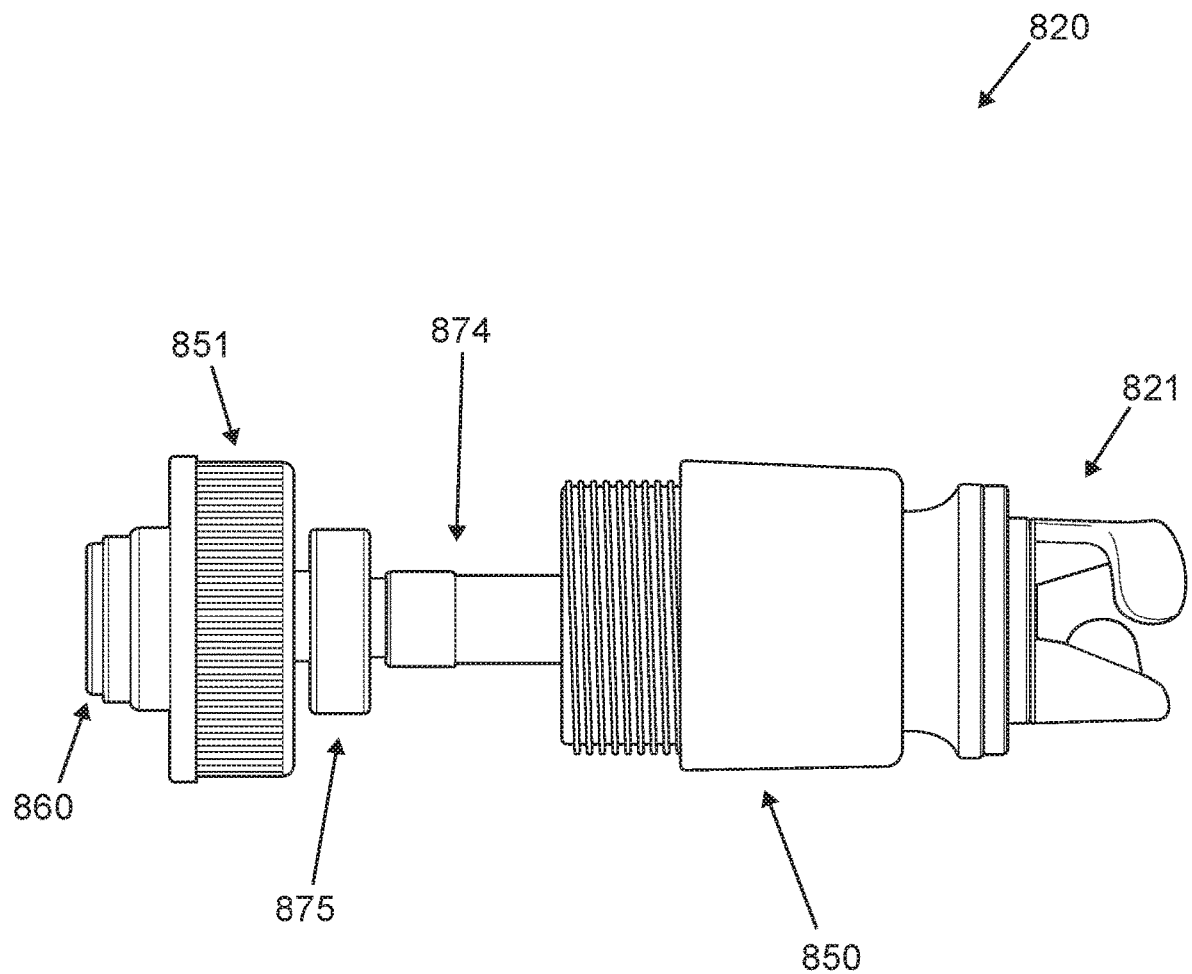
FIG. 11 is an illustration of one embodiment of a threaded connector that comprises a flow regulator and one-way check valve.

FIG. 11 is an illustration of one embodiment of an iSUP connector that comprises a flow regulator and one-way check valve. As shown in FIG. 11 the iSUP connector 820 is in a disconnected configuration and may comprise an iSUP twist lock connection adapter 821, which is configured to attach to the standard iSUP inlet/outlet valve. The iSUP connector 820 may further comprise a check valve 875, which may be configured to only allow air to flow from the iSUP and to not allow liquid (or air) to flow into the iSUP (when connected to the device of the present disclosure). As shown, the check valve 875 may preferably be integrated into tube 874, which, when the iSUP connector 820 is connected to an iSUP inlet/outlet, passes air from the iSUP to the container of the present disclosure. The two threaded portions 850 and 851 are configured to threadingly engage with each other to regulate and shut off the flow of air from the SUP to the container. Although threaded portions 850 and 851 are shown as entirely disengageable, in one embodiment they are not completely separable but screw or twist together to start or increase the flow and screw apart to stop or decrease the flow. The end 860 of the iSUP connector 820 leads to the container or a quick release connector valve that may attach to the container. Although threaded portion 850 is shown with external threads that engage with the internal threads of threaded portion 851, the threads may be vice versa, so long as the two threaded portions are configured to matingly engage with each other.

Preferably, the tube 874 and threaded portion 851 are substantially static with each other, such that when threaded portion 851 is screwed onto threaded portion 850, the tube 874 also moves to a base of threaded portion 850. In this manner, the end of the tube 874 contacts the shaft or pin of the iSUP inlet/outlet valve and eventually opens the iSUP inlet/outlet valve.

Figure 12:
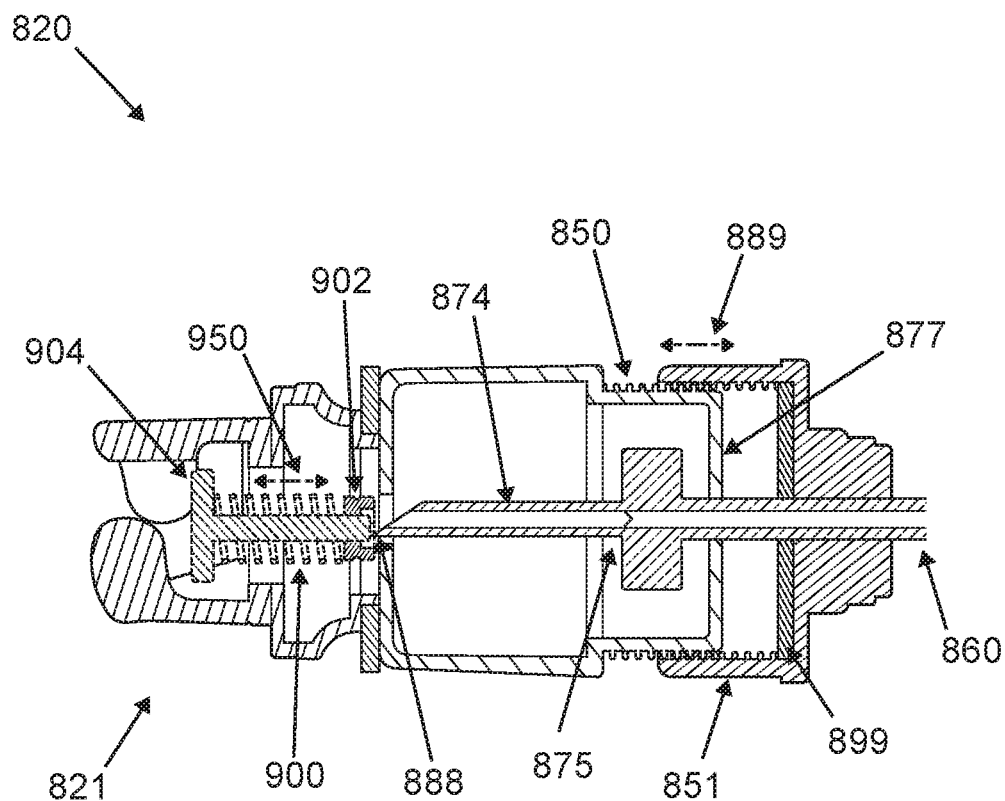
FIG. 12 is an illustration of a cross-section view of one embodiment of a threaded connector that comprises a flow regulator and one-way check valve.

FIG. 12 is an illustration of a cross-section view of one embodiment of an iSUP connector that comprises a flow regulator and one-way check valve. As shown in FIG. 12 the iSUP connector 820 may comprise an iSUP twist lock connection adapter 821, which is configured to attach to the standard iSUP inlet/outlet valve. The term "fluid" includes both air and liquids. The iSUP connector 820 may further comprise a check valve 875, which may be configured to only allow fluid to flow from the iSUP and not into the iSUP (when connected to the device of the present disclosure). In this case the check valve 875 allows air out and does not allow liquid or air in to the iSUP. As shown, the check valve 875 may preferably be integrated into tube 874, which, when the iSUP connector 820 is connected and in an open configuration, passes air from the iSUP to the container of the present disclosure.

The two threaded portions 850 and 851 are configured to threadingly engage with each other to regulate and shut off the flow of air from the iSUP to the container. Preferably, the tube 874 and threaded portion 851 are substantially static with each other, such that when threaded portion 851 is screwed onto threaded portion 850, the tube 874 also moves to a base of threaded portion 850. In this manner, the end of the tube 874 contacts the shaft or pin of the iSUP inlet/outlet valve and eventually opens the iSUP inlet/outlet valve.

Preferably, the threaded portions 850 and 851 are configured to move apart or closer together 889, depending on which way threaded portion 851 is rotated. Typically, clockwise turning of the threaded portion 851 brings the two threaded portions 850, 851 closer together, which causes the iSUP valve to open. Preferably, the two threaded portions 850, 851 cannot be entirely disengageable from each other.

The end 860 of the iSUP connector 820 leads to the container or a quick release connector valve that may attach to the container. Although threaded portion 850 is shown with external threads that engage with the internal threads of threaded portion 851, the threads may be vice versa, so long as the two threaded portions are configured to matingly engage with each other.

FIG. 12 shows that a gasket 899 or washer may be housed in the interior top of the threaded portion 851. Gasket 899 may preferably ensure an airtight seal when it contacts end 877, which preferably happens after the two threaded portions 850, 851 are twisted together as much as possible, which preferably causes the iSUP valve to be open as wide as possible. In this manner, air from the iSUP is not able to escape the iSUP connector 820 and is directed into the container after going past the check valve 875.

When the iSUP connector 820 is engaged with the iSUP inlet/outlet, the terminal end 888 of the tube 874 pushes open the spring-loaded valve 900 on the iSUP inlet/outlet as the threaded portion 851 is screwed onto threaded portion 850, which starts the flow of air from the iSUP. The typical spring-loaded valve 900 on the iSUP comprises a plunger 904 at the end of a shaft 902 or pin. The plunger 904 is configured to move up and down 950 in response to downward force and an upward biasing spring. When the shaft 902 is pushed downward, the plunger 904 of the spring-loaded valve 900 moves and opens the spring-loaded valve 900. The further the shaft 902 is pushed down, the greater the volume of air is able to flow out of (or into, if filling the SUP) the SUP. Thus, the user opens, closes, and regulates the flow of air from the iSUP by turning threaded portion 851 with respect to threaded portion 850. Regardless of whether the air is flowing or not, the user may disconnect the iSUP connector 820 from the iSUP inlet/outlet. To prevent unwanted occlusion of the tube 874, the terminal end 888 of the tube 874 may be perforated with side holes or cut on the bias (as shown).

Figure 13:
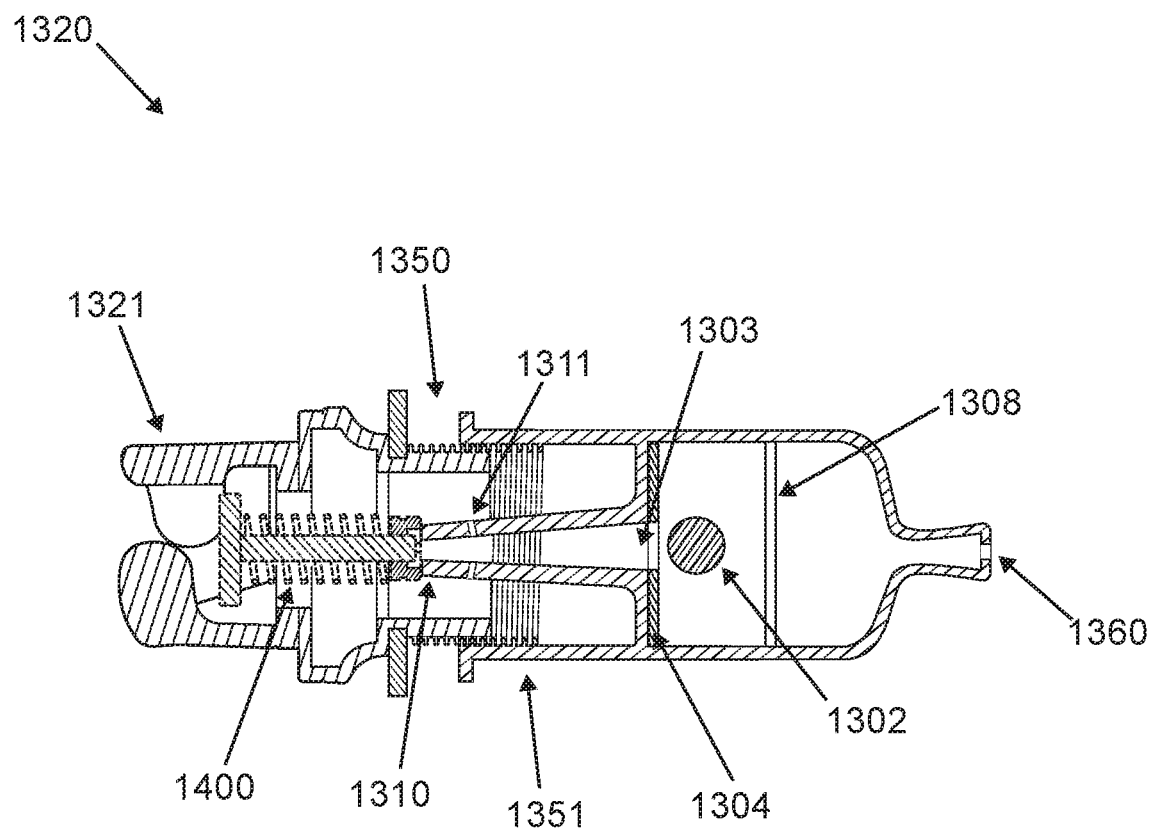
FIG. 13 is an illustration of a cross-sectional view of another embodiment of a threaded connector with a flow regulator and one-way check valve.

FIG. 13 is an illustration of a cross-sectional view of another embodiment of a threaded connector with a flow regulator and one-way check valve. As shown in FIG. 13, the connector 1320 comprises an iSUP twist lock connection adapter 1321, first threaded portion 1350, a second threaded portion 1351, ball 1302, bar 1308, washer 1304, valve engagement tip 1310, outlet end 1360, and iSUP twist lock connection adapter 1321. As shown in this embodiment, the valve engagement tip 1310 engages with the iSUP valve 1400 to open and increase the flow of air from the iSUP as the second threaded portion 1351 is twisted (preferably clockwise) onto the first threaded portion 1350. In the event that the iSUP valve 1400 is open and pressure flows into the iSUP, the ball 1302 acts as a check valve by covering hole 1303. Washer 1304, which may preferably be rubber, engages with the sides of the ball 1302 to form a fluid tight seal that prevents fluid from flowing into the iSUP. The bar 1308 prevents the ball 1302 from occluding the outlet end 1360, but does not impede the flow of air from the iSUP to the container of the present disclosure.

To close the iSUP valve 1400 or reduce the flow of air, the second threaded portion 1351 may be twisted in an opposite direction (typically counterclockwise) with respect to the first threaded portion 1350.

As shown, the valve engagement tip 1310 may have side holes 1311, which allow the flow of air through the connector 1320 even if the very end of the valve engagement tip 1310 is substantially occluded by the tip of iSUP valve 1400.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A liquid sprayer powered by an inflatable standup paddle board (iSUP), comprising:
    a container;
    a sprayer hose; and
    an air hose;
    wherein said container is configured to hold a liquid;
    wherein said sprayer hose comprises a spray nozzle and is configured to pass said liquid from said container through said spray nozzle;
    wherein said air hose is configured to connect to said container and to said iSUP;
    wherein said air hose comprises a flow regulator and a one-way check valve;
    wherein said flow regulator is configured to start, stop, increase, and decrease a flow of air from said iSUP into said container;
    wherein said one-way check valve is configured to substantially prevent said liquid from entering said iSUP;
    wherein said container is configured to accept said flow of air from said iSUP when connected to said iSUP, such that said container is pressurized; and
    wherein when said container is pressurized, said spray nozzle passes said liquid out of said liquid sprayer.

2. The liquid sprayer of claim 1, wherein said sprayer hose extends substantially to a bottom of said container.

3. The liquid sprayer of claim 1, wherein said container comprises one or more inlet/outlets.

4. The liquid sprayer of claim 3, wherein there are two inlet/outlets comprising a sprayer outlet and an air inlet;
    wherein said air inlet is configured to connect to said air hose; and
    wherein said sprayer outlet is configured to connect to said sprayer hose.

5. The liquid sprayer of claim 3, wherein said container comprises one inlet/outlet.

6. The liquid sprayer of claim 5, wherein said inlet/outlet is a combination sprayer outlet and an air inlet;
    wherein said inlet/outlet is configured to connect to both said air hose and said sprayer hose.

7. The liquid sprayer of claim 1, wherein said flow regulator is a ball-valve.

8. The liquid sprayer of claim 1, wherein said flow regulator comprises a clamping flow regulator.

9. A liquid sprayer powered by an inflatable standup paddle board (iSUP), comprising:
    a container;
    a sprayer hose;
    an air hose;
    a flow regulator; and
    an iSUP connector;
    wherein said container is configured to hold a liquid;
    wherein said sprayer hose comprises a spray nozzle and is configured to pass said liquid from said container through said spray nozzle;
    wherein said iSUP connector comprises an iSUP adaptor and a one-way check valve;
    wherein said iSUP connector is configured to start, stop, increase, and decrease a flow of air from an iSUP to said air hose and said container;
    wherein said air hose is configured to connect to said iSUP connector;
    wherein said flow regulator is configured to start, stop, increase, and decrease a flow of air from said iSUP into said container;
    wherein said one-way check valve is configured to substantially prevent said liquid from entering said iSUP;
    wherein said iSUP adaptor is configured to connect to said iSUP;
    wherein said container is configured to accept said flow of air from said iSUP when connected to said iSUP, such that said container is pressurized; and
    wherein when said container is pressurized, said spray nozzle passes said liquid out of said liquid sprayer.

10. The liquid sprayer of claim 9, wherein said sprayer hose extends substantially to a bottom of said container.

11. The liquid sprayer of claim 9, wherein said container comprises one or more inlet/outlets.

12. The liquid sprayer of claim 11, wherein there are two inlet/outlets comprising a sprayer outlet and an air inlet;
    wherein said air inlet is configured to connect to said air hose; and
    wherein said sprayer outlet is configured to connect to said sprayer hose.

13. The liquid sprayer of claim 11, wherein said container comprises one inlet/outlet;
    wherein said inlet/outlet is a combination sprayer outlet and an air inlet; and
    wherein said inlet/outlet is configured to connect to both said air hose and said sprayer hose.

14. The liquid sprayer of claim 9, wherein said iSUP connector comprises a first threaded portion and a second threaded portion that when twisted together is configured to start and increase said flow of air, and when twisted apart is configured to stop and decrease said flow of air.

15. The liquid sprayer of claim 14, wherein said first threaded portion and said second threaded portion are configured to not be entirely disengageable.

16. The liquid sprayer of claim 9, wherein said flow regulator is a ball-valve.

17. The liquid sprayer of claim 9, wherein said flow regulator comprises a clamping flow regulator.

18. A connector that connects a liquid sprayer to a pressurized air source for powering said liquid sprayer, comprising:
    an air hose;
    a one-way check valve;
    a flow regulator;
    a container connector; and
    an air source connector;
    wherein said air source connector is configured to connect to a pressurized air source and accept a flow of air from said pressurized air source when connected;
    wherein said air source connector is configured to connect to said air hose;

wherein said air hose is configured to be connected to said container connector;

wherein said one-way check valve is configured to substantially prevent a liquid from a container from entering said pressurized air source;

wherein said flow regulator is configured to start, stop, increase, and decrease said flow of air from said pressurized air source into said container; and wherein said pressurized air source is an inflatable standup paddle board (iSUP) and said air source connector is configured to engage with said iSUP.

19. The connector of claim 18, wherein said container connector is selected from a group of connectors consisting of: a threaded connector and a quick-release connector.

20. The connector of claim 18, wherein said air source connector comprises said one-way check valve and said flow regulator.

\* \* \* \* \*